United States Patent [19]
Ricci

[11] Patent Number: 6,065,378
[45] Date of Patent: May 23, 2000

[54] PORTABLE JOURNAL TURNING LATHE

[76] Inventor: Donato L. Ricci, W8477—162nd Ave., Hager City, Wis. 54014

[21] Appl. No.: 09/197,759

[22] Filed: Nov. 23, 1998

[51] Int. Cl.$^7$ ........................................................ B23B 5/14
[52] U.S. Cl. ................................. 82/128; 82/113; 82/130
[58] Field of Search .............................. 82/128, 130, 131, 82/132, 113

[56] References Cited

U.S. PATENT DOCUMENTS

| | | |
|---|---|---|
| 2,796,792 | 6/1957 | Dias . |
| 4,359,917 | 11/1982 | Wilger et al. . |
| 4,739,685 | 4/1988 | Ricci . |
| 4,799,409 | 1/1989 | Ricci . |
| 4,813,314 | 3/1989 | Kwech ...................................... 82/113 |
| 4,922,772 | 5/1990 | Silk . |
| 4,939,964 | 7/1990 | Ricci . |
| 4,944,205 | 7/1990 | Ricci . |
| 5,056,389 | 10/1991 | Johnstead .................................. 82/128 |
| 5,116,566 | 5/1992 | Ricci . |
| 5,189,933 | 3/1993 | Ricci . |
| 5,660,093 | 8/1997 | Ricci . |

*Primary Examiner*—Anthony Knight
*Assistant Examiner*—Mark Williams
*Attorney, Agent, or Firm*—Nikolai, Mersereau & Dietz, P.A.

[57] ABSTRACT

The portable lathe 10 for turning a shaft at a job site in the field includes a pair of clamping rings 12 and 14 that are adapted to be centered at spaced-apart locations along a length of a shaft to be refurbished. Extending between the clamping rings are a plurality of glide shafts 40, 42, 56, 58 which slidingly support a split-ring clamshell assembly 68. A cutting tool carrier 100 is affixed to the rotatable ring portion 74 of the clamshell assembly so that when the movable ring is driven, the tool carrier orbits the shaft being refurbished. A feed screw 98 driven by a servo motor 92 translates the clamshell assembly along the glide shafts.

15 Claims, 2 Drawing Sheets

PORTABLE JOURNAL TURNING LATHE

BACKGROUND OF THE INVENTION

1. Field of the Invention

This invention relates generally to apparatus for repairing and refurbishing the bearing surfaces of rotating shafts of large machines at a job site, and more particularly to a portable journal turning lathe that can be readily transported to a location in the field where a machine is to be repaired, mounted in place on the machine's shaft to be turned and then operated to remove any scoring and other surface irregularities from the shaft so that it is ready for replacement of its bearings.

2. Discussion of the Prior Art

In my earlier U.S. Pat. No. 5,660,093 I describe a portable journal turning lathe that comprises a pair of split clamshell assemblies that are held in parallel, spaced relationship by a plurality of spacer rods, two of which support a tool carrier assembly for axial movement relative to a shaft to be turned by the lathe. The tool carrier assembly includes at least one, but preferably two, cutting tool advancing mechanisms for controlling the radial position of the cutting tools and, hence, the depth-of-cut. The tool carrier assembly is arranged to be reciprocally driven in the axial direction by a threaded lead screw, driven by a star wheel which rotates through a predetermined angle upon each full rotation of the clamshell's movable ring member. The lead screw operates with a quick-release nut in the tool carrier assembly to permit rapid return of the tool carrier assembly to a home position upon completion of a pass.

In this earlier arrangement described in my '093 patent, the entire assembly including the guide rods 38 and 40, the tool slide block 46 and the cutting tool carriers 56 and 58 along with the counter weights including stabilizer brackets 28 and 32 and the spacer rods 42 and 43 all orbit the shaft to be turned as the ring gear 22 of the clamshell assembly 16 is driven. As such, in close quarters where the shaft to be turned is close to other stationary objects, there have been applications where that device could not be used because of the relatively large diameter of the sweep of outwardly projecting structures, such as its tool adjustment knobs 62. It was also found somewhat difficult to hold tolerances, given the change in the center of mass of the spinning structure as the tool carriage assembly 46 traversed its longitudinal path of travel.

In the journal turning lathe of my earlier '093 patent, a certain amount of difficulty is encountered in efforts to properly concentrically mount the clamshell assemblies relative to the shaft to be turned so that the support rails 38, 40, 42 and 43 will extend parallel to the shaft to be turned. It might typically take about two hours to install the journal turning lathe of the '093 patent on the shaft.

Still another drawback of my earlier design resides in the fact that the length of longitudinal travel of the tool slide block 46 is limited by the distance between the clamshell assemblies on each end of the guide rods. With this arrangement, it was not possible to turn the shaft all the way to a shoulder on a shaft or to its free end because a certain shaft length proximate its free end had to be used for mounting one of the pair of split clamshell assemblies to the shaft.

The journal turning lathe of the present invention obviates each of these drawbacks. Rather than having a pair of split ring clamshell assemblies at each end thereof, my present invention employs a pair of stationary clamping rings that are adapted to be centered at spaced-apart locations along a length of the shaft to be turned and extending between the clamping rings are a plurality of elongated, cylindrical glide shafts. A split ring clamshell assembly of the type having a stationary ring and a movable or rotatable ring journaled to the stationary ring is slidably supported on the plurality of glide shafts. Separate motors are provided for rotating the movable ring on the clamshell lathe assembly and for translating the clamshell lathe assembly longitudinally along the glide rails between the clamping rings.

The clamping rings each include a plurality of centering screws allowing accurate positioning of the clamping rings on the shaft to be turned and with the clamping rings so fixed, the clamshell assembly also becomes centered relative to the shaft to be turned, thereby dramatically reducing the overall set-up time before the shaft turning operation can ensue. In the case of the present invention compared to my earlier arrangement, the set-up time has been cut in half—— from about 2 hours to 1 hour. Also, the man hours required has been reduced from about 4 to 1.

To allow turning of the shaft all the way to its end, with my improved invention, the pair of clamping rings can be located on the shaft with a relatively close spacing therebetween allowing the clamshell assembly to be cantilevered on the ends of the glide rods outboard of one of the clamping rings.

SUMMARY OF THE INVENTION

The foregoing features and advantages of the present invention are achieved by providing a portable lathe for turning a shaft that comprises first and second clamping rings adapted to be centered at spaced-apart locations along the length of the shaft to be turned. Supported by the first and second clamping rings are a plurality of elongated, cylindrical glide shafts. A clamshell assembly is slidingly supported on the plurality of glide shafts, the clamshell assembly being of the type including a stationary ring member and a movable ring member journaled for rotation relative to the stationary ring member. A cutting tool carrier is mounted on the movable ring member of the clamshell assembly for supporting a cutting tool. The cutting tool carrier includes means for adjusting the radial displacement of the cutting tool relative to the shaft to be turned. A first drive means is provided for translating the clamshell assembly along the glide shafts and a second drive means is mounted on the stationary ring member for rotating the movable ring member carrying the tool carrier.

The first and second clamping rings each include a plurality of threaded radial bores extending through them and threadingly fitted into these is a corresponding plurality of adjustable shaft-centering screws which can be readily adjusted for rendering the clamshell assembly concentric with the axis of the shaft to be turned at the time of set-up.

DESCRIPTION OF THE PREFERRED EMBODIMENT

Figure 1:
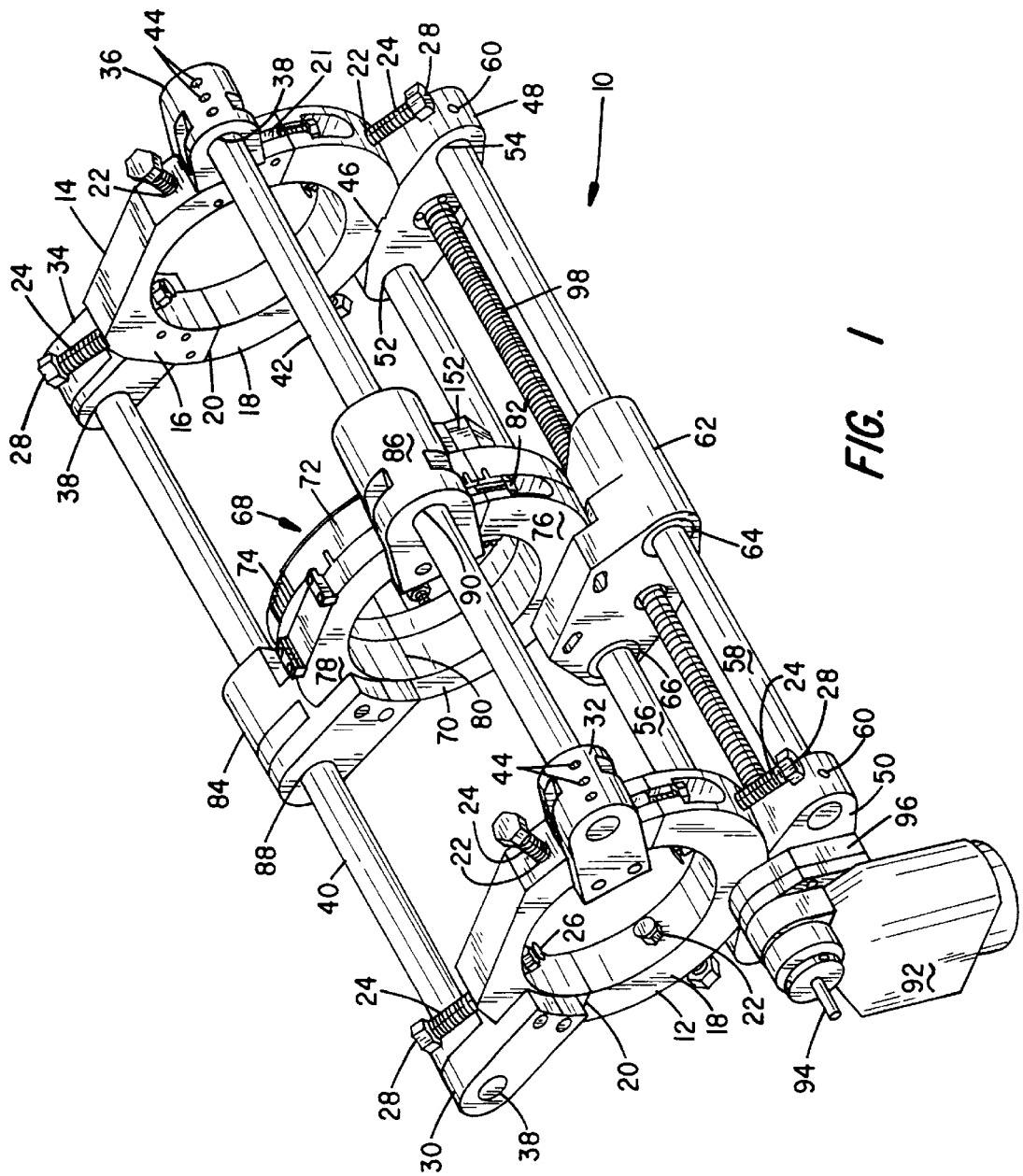

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

The foregoing features, objects and advantages of the invention will become apparent to those skilled in the art from the following detailed description of a preferred embodiment, especially when considered in conjunction with the accompanying drawings in which like numerals in the several views refer to corresponding parts.

Figure 2:
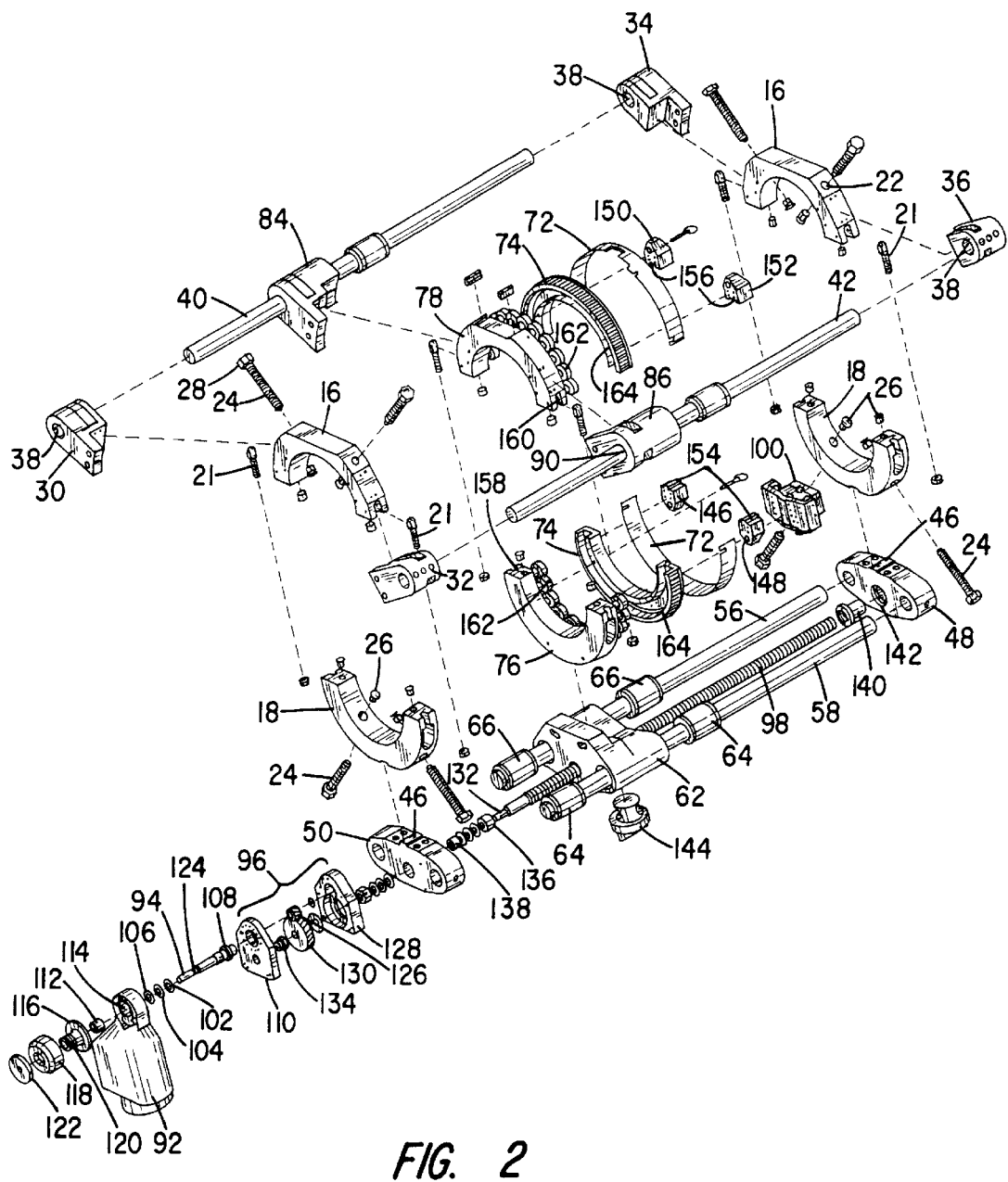

FIG. 1 is a perspective view of the portable journal turning lathe comprising a preferred embodiment of the present invention; and FIG. 2 is an exploded view of the journal turning lathe of FIG. 1.

DESCRIPTION OF THE PREFERRED EMBODIMENT

Referring first to FIG. 1, there is indicated generally by numeral 10 a portable journal turning lathe constructed in accordance with the present invention. It is adapted to be mounted on a shaft (not shown) whose surface is in need of refurbishing due to uneven wear or scoring, which, for example, may have been caused by a failed journal bearing. The journal turning lathe is seen to comprise first and second clamping rings 12 and 14 having an inside diameter large enough to surround the shaft to be turned. The clamping rings 12 and 14 are substantially similar in their construction, each including semi-circular segments 16 and 18 which can be releasibly fastened together along a parting line 20 by swing bolts 21 to form an annulus.

Formed radially through the thickness dimension of the clamping rings at 900 intervals are threaded bores, as at 22, into which are threadedly fitted a plurality of centering bolts 24. On the innermost end on each of the bolts 24 is a swivel pad as at 26 for cooperating with a cylindrical outside diameter of the shaft to be turned. By placing a wrench on the bolt heads 28 and rotating them, the centering screws 24 can be moved in and out in a radial direction to accommodate a range of shaft sizes to be finished.

Bolted to the clamping ring segment 16 of clamping ring 12 are a pair of ring guides, individually identified by numerals 30 and 32. Likewise, ring guides 34 and 36 are bolted to the ring segment 16 of clamping ring 14. The ring guides 30, 32, 34 and 36 each include a longitudinally extending bore as at 38. Fitted into the bores 38 of ring guides 30 and 34 is a first glide shaft 40 comprising a smooth cylindrical steel rod. An identical glide shaft 42 extends between the ring guide 32 on clamping ring 12 and the ring guide 36 on clamping ring 14. Set screws, as at 44, are used to secure the glide shafts 40 and 42 in their respective bores 38.

A dove-tail key-way, as at 46, is formed in the base of the clamping ring segments 18 of each of the clamping ring assemblies for slidingly receiving slide support members 48 and 50 therein. Each includes a pair of laterally spaced, longitudinal bores, as at 52 and 54, on slide support 48, and fitted through them and extending between slide supports 48 and 50 are glide shafts 56 and 58. Again, set screws, as at 60, may be used to firmly lock the glide shafts 56 and 58 in the bores formed for them in the slide support members 48 and 50.

Slidingly disposed on the glide shafts 56 and 58 is a clam drive module 62. Linear bearings, as at 64 and 66, cooperate with the glide shafts 56 and 58 to permit smooth reciprocal longitudinal sliding movement between the clam drive module 62 and glide shafts 56 and 58.

Bolted to and carried by the clam drive module is a clamshell assembly, indicated generally by numeral 68. This clamshell assembly may be of the type more particularly described in my earlier U.S. Pat. No. 5,549,024 the teachings of which are hereby incorporated by reference as if set forth in full herein. As is explained in the '024 patent, the split frame clamshell assembly 68 includes a stationary ring member 70 that is bolted to the clam drive module 62. Disposed beneath a protective shroud 72 and journaled for rotation on bearings (not shown in FIG. 1) that extend in the axial direction from a flat side surface of the stationary clamping ring 70 is a movable gear ring 74, only a small portion of which can be seen through an opening formed in the protective shroud 72 in FIG. 1. This movable gear ring is adapted to be driven by a suitable motor (not shown), such as a pneumatic, hydraulic or electric motor. The manner in which the motor is configured to drive the rotatable gear ring 74 of a clamshell assembly is fully disclosed in the aforereferenced '024 patent and need not be repeated here.

The split-ring clamshell comprises two semi-circular segments 76 and 78 that join together along a parting line 80 and may be securely clamped together by swing bolts, as at 82.

Bolted to the exterior side surface of the stationary clamshell ring 70 are first and second clamshell guide members 84 and 86. These guide members each include a longitudinal bore, as at 88 and 90, for receiving linear bearings therein, the linear bearings surrounding the glide shafts 40 and 42.

Completing the portable journal turning lathe 10 is an assembly for translating the clam drive module 62 and the clamshell assembly 68 along the glide shafts 40, 42, 56 and 58. That drive assembly will now be explained. It includes a servo motor 92 having a drive shaft 94 extending into a gear box assembly 96 that is bolted to the slide support member 50 affixed to the underside of the clamping ring segment 18. The gear box 96 includes a small diameter helical gear affixed to the drive shaft 94 and a larger diameter helical gear affixed to a threaded feed screw 98 that is journaled for rotation within the slide support 48 and 50 associated with the clamping rings 12 and 14. As is described in my aforereferenced '093 patent, disposed in the clam drive module 62 and surrounding the feed screw 98 is a feed nut that can be made to selectively engage with and disengage from the threaded exterior of the feed screw 98. The feed nut engages the clam drive module and when engaged with the threads on the feed screw, rotation of the feed screw will translate the clam drive module along the glide rods 40, 42 and 56, 58 in the zone between the clamping rings 12 and 14. When the feed nut is disengaged from the feed screw 98, the clamshell assembly 68 can be manually repositioned by merely sliding the assembly along the aforementioned glide shafts. Finally, there is attached to the flat side surface of the rotatable ring gear 74 a tool block slide assembly 100 (FIG. 2) which, as in the embodiment shown in my '093 patent, allows radial positioning of a cutting tool using a micrometer adjustment mechanism known in the art.

Having described the constructional features of the present invention in general terms, consideration will next be given to a more detailed description of the individual parts comprising the assembly of FIG. 1 and, in this regard, reference will be made to the exploded view of FIG. 2.

Referring to the exploded view of FIG. 2, and focusing first on the manner in which the servo drive motor 92 is connected in driving relation to the feed screw 98, the drive shaft 94 extends through thrust washer 102, a thrust bearing 104 and another thrust washer 106 which abut the shoulder 108 on the output shaft 94. The gear reduction box 96 has a cover plate 110 that bolts to the servo drive motor 92 with the output shaft 94 passing through a bearing 112 fitted into a circular bore 114 in the servo motor housing. A drive gear 116 is keyed to the end of the drive shaft 94 and an internally threaded collar 118 is screwed onto the threads 120 of the drive gear 116. A threaded washer 122 screws onto threads 124 on the output shaft 94, thus holding the assembly together.

A helical gear 126 is keyed to the end of the drive shaft 94 and is disposed within a gear box housing member 128 where it meshes with a second helical gear 130 that is keyed to the end 132 of the threaded feed screw 98. The end 132 of the feed screw is disposed within a bushing 134 that fits within a circular aperture formed in the cover plate 110. The end portion of the shaft 98 is further journaled in the slide support 50 by bushings 136 and 138.

The opposite end of the threaded feed screw 98 is journaled in the end support 48 by means of an end support bushing 140 that fits into the bore 142 of the end support 48.

As was earlier mentioned, the clam drive module 62 contains a feed nut that can be made to selectively engage with and disengage from the feed screw 98. In FIG. 2, the feed nut is identified by numeral 144 and the manner in which it cooperates with the feed screw is explained with particularity in my earlier U.S. Pat. No. 5,660,093 which has been incorporated by reference herein. As is explained in that patent, when the feed nut 144 engages the feed screw 98 and the feed screw is rotated, the clam drive module 62 is translated in a direction depending on the direction of rotation of the feed screw.

The exploded view of FIG. 2 also shows the manner in which the two semi-circular halves of the ring gear 74 join together and also the manner in which the ring gear 74 is journaled for rotation relative to the stationary ring member comprising semi-circular segments 76 and 78. Specifically, male gear clamp members 146 and 148 bolt to the lower ring gear segment while female gear clamp members 150 and 152 bolt to the upper ring gear segment. The male gear clamp members 146 and 148 each have a dove-tail projection 154 formed on a top surface thereof designed to mate with a female dove-tail groove 156 formed in the undersurface of the clamping members 150 and 152. Thus, when the ring members are properly aligned, the parts are held in place by the engagement of the male and female clamping members.

Seen projecting outwardly from a face 158 of the stationary clamshell ring 76 and the face 160 of the stationary clamshell ring segment 78 are a plurality of bearing members, as at 162, which are adapted to fit within a race groove 164 formed in a face of the ring gear segments 74. The bearings 162 support and journal the ring gear 74 for rotation. Those desiring additional information on the construction of a typical split ring clamshell and especially the manner in which the movable ring is journaled to the stationary ring are referred to my earlier U.S. Pat. No. 5,549,024, the teaching of which are hereby incorporated by reference. Similarly, the tool holder 100 may be like that shown in my co-pending application Ser. No. 09/066,024, filed Apr. 24, 1998, and entitled "Improved Slide Assembly for Automated Cutting Tool".

OPERATION

Having described the constructional features of the preferred embodiment in detail, consideration will next be given to its mode of operation.

The portable journal turning lathe of the present invention will be brought to the job site with the clamping rings 12 and 14 attached to the slide supports 48 and 50, but with the upper and lower halves of the clamping rings 12 and 14 separated from one another. Likewise, the clamshell assembly 68 may be split and unbolted from the clam drive module 62. When broken down in this fashion, the parts comprising the journal turning lathe can be readily carried by a single person. Furthermore, the setup, i.e., mounting of the journal turning lathe 10 on the shaft to be turned can also readily be carried out by a single operator. First, the glide rails 40 and 42 along with the upper half of the ring gear assembly 68 may be rested on the shaft while the lower halves 18 of the clamping rings 12 and 14 on glide rails 56 and 58 are placed beneath the shaft to be refurbished and coupled to the corresponding upper halves 16 thereof.

Next, by appropriately adjusting the centering bolts 24 and using a gauge, the clamping rings can be roughly adjusted so that they are concentric with the shaft to be turned. Because the glide rails 40, 42 and 56, 58 are of equal length, when the clamping rings are fitted thereon, they are necessarily held in a parallel relationship and with the glide rails also extending parallel to the shaft to be turned. To precisely adjust the journal turning lathe assembly 10 relative to the shaft, the operator may disengage the feed nut 144 from the threaded feed screw 98 and manually position the clamshell assembly 68 proximate one of the clamping rings at a first end of the glide rods and then observe any eccentricity in the cutting tool relative to the shaft as the tool carrier is rotated. Again, by adjusting the centering screws 24 any such eccentricity can be eliminated. Next, the clamshell assembly 68 may be manually shifted down close to the clamping ring at the opposite end and the operation repeated. Once any eccentricity is eliminated proximate the second clamping ring, the machine is ready to be operated to turn the shaft workpiece.

Whereas the time required to install and setup the journal turning lathe described in my earlier patent 5,660,093 might typically be about two hours, slightly less than one hour is typically required to install the journal turning lathe of the present invention on a shaft to be machined.

Automatic turning of the shaft takes place by first manually positioning the split ring clamshell 68 closely adjacent one or the other of the clamping rings 12 and 14 and then turning on an air motor (not shown) that is coupled in driving relation to the stationary ring segment 78, with its drive gear engaging the peripheral gear teeth on the movable ring member 74. This causes the movable ring 74 to rotate on the bearings 162, carrying the tool block slide assembly 100 with it. The radial disposition of the tool bit itself is manually adjusted in the radial direction by the operator to establish a desired depth-of-cut. Then, the servo motor 92 is energized to rotate the feed screw 98 longitudinally from its starting point toward the opposite clamping ring. As the clamshell assembly 68 is slowly translated by the feed screw, the cutting tool moves circumferentially about the workpiece, thereby restoring a true cylindrical surface to the shaft. Several passes may be required depending upon the degree of scoring being repaired and the cutting depth adjustment employed.

Another advantage of the journal turning lathe of the present invention is that, if necessary, the clamshell assembly and clam drive module can be mounted on the glide rails out-board of one or the other of the two clamping rings rather than between them. This allows the cutting tool to be brought into close engagement with either a shoulder on the shaft being refurbished or an end of the shaft. That is to say, the surface of the shaft otherwise occupied by the clamping rings can be turned by simply removing one of the clamping ring assemblies and its associated end support and ring guides from the glide rails, slipping the clamshell assembly and the clam drive module free of the glide rails and feed screw, replacing the removed clamping ring assembly, positioning it inward from the ends of the glide rods and closer to the other clamping ring assembly and then reinstalling the clamshell assembly 68 onto the free ends of the glide rods and feed screw.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A portable lathe for turning a shaft comprising, in combination:
   (a) first and second clamping rings adapted to be centered at spaced apart locations along a length of a shaft to be turned, said first and second clamping rings supporting a plurality of elongated cylindrical glide shafts;
   (b) a clamshell assembly adapted to be slidingly supported on said plurality of glide shafts at a first location between the first and second clamping rings and at a second location outboard of one of the first and second clamping rings, said clamshell assembly including a non-rotatable ring member and a rotatable ring member journaled for rotation relative to the non-rotatable ring member;
   (c) a cutting tool carrier mounted on the rotatable ring member for supporting a cutting tool, said cutting tool carrier including means for adjusting radial displacement of the cutting tool relative to the shaft to be turned; and
   (d) first drive means for translating the clamshell assembly along said glide shafts and second drive means mounted on the non-rotatable ring member for rotating the rotatable ring member.

2. The portable lathe of claim 1 wherein the first drive means comprises:
   (a) a drive housing affixed to the non-rotatable ring member and slidable along at least one of the plurality of glide shafts, the drive housing containing a longitudinal bore;
   (b) a threaded lead screw journaled for rotation at opposed ends in the first and second clamping rings, the lead screw extending through the longitudinal bore of the drive housing;
   (c) a feed nut disposed on the threaded lead screw and engaging the drive housing so that rotation of the threaded lead screw longitudinal displaces the drive housing and clamshell assembly; and
   (d) motor means for rotating the threaded lead screw.

3. The portable lathe of claim 2 and further including a gear reduction box coupling the motor means to the threaded lead screw.

4. The portable lathe of claim 2 wherein the feed nut is selectively engageable and disengageable with the threaded lead screw.

5. The portable lathe of claim 1 wherein the non-rotatable ring member and the rotatable ring member each comprise two separable semicircular ring segments adapted to be joined together in surrounding region to the shaft to be turned.

6. The portable lathe of claim 3 wherein the rotatable ring member includes gear teeth on our outer peripheral surface thereof and the second drive means includes a motor affixed to the non-rotatable ring member and having a spur gear on an output shaft of said motor for engaging the gear teeth on the movable ring member.

7. The portable lathe of claim 1 wherein the first and second clamping rings each include a plurality of threaded radial bores extending therethrough with a corresponding plurality of adjustable shaft centering screws extending therethrough.

8. The portable lathe of claim 5 and further including a swivel pad affixed to an inner end of each of the shaft-centering screws adapted to engage a shaft to be refurbished.

9. The portable lathe of claim 5 wherein the first and second clamping rings each comprise first and second semicircular clamping ring segments adapted to be joined together in surrounding relation to the shaft to be refurbished.

10. A portable lathe for turning a shaft comprising, in combination:
   (a) first and second clamping rings, each including first and second semicircular clamping ring segments adapted to be joined together in surrounding relation to the shaft to be turned, the first and second clamping rings having a plurality of threaded bores extending therethrough with a corresponding plurality of adjustable shaft centering screws extending therethrough, said first and second clamping rings supporting a plurality of glide shafts;
   (b) a clamshell assembly slidingly supported on said plurality of glide shafts, said clamshell assembly including a non-rotatable ring member and a rotatable ring member journaled for rotation relative to the non-rotatable ring member;
   (c) a cutting tool carrier mounted on the movable ring member for supporting a cutting tool, said cutting tool carrier including means for adjusting radial displacement of the cutting tool relative to the shaft to be turned; and
   (d) first drive means for translating the clamshell assembly along said glide shafts and second drive means mounted on the non-rotatable ring member for rotating the rotatable ring member, said first drive means including
      (i) a drive housing affixed to the non-rotatable ring member and slidable along at least one of the plurality of glide shafts, the drive housing containing a longitudinal bore,
      (ii) a threaded lead screw journaled for rotation at opposed ends in the first and second clamping rings, the lead screw extending through the longitudinal bore of the drive housing,
      (iii) a feed nut disposed on the threaded lead screw and engaging the drive housing so that rotation of the threaded lead screw longitudinal displaces the drive housing and clamshell assembly, and (iv) motor means for rotating the threaded lead screw.

11. The portable lathe of claim 10 wherein the non-rotatable ring member and the rotatable ring member each comprise two separable semicircular ring segments adapted to be joined together in surrounding relation to the shaft to be turned.

12. The portable lathe of claim 11 wherein the rotatable ring member includes gear teeth on our outer peripheral surface thereof and the second drive means includes a motor affixed to the non-rotatable ring member and having a spur gear on an output shaft of said motor for engaging the gear teeth on the rotatable ring member.

13. The portable lathe of claim 10 and further including a swivel pad affixed to an inner end of each of the shaft-centering screws adapted to engage a shaft to be turned.

14. The portable lathe of claim 10 and further including a gear reduction box coupling the motor means to the threaded lead screw.

15. The portable lathe of claim 10 wherein the feed nut is selectively engageable and disengageable with the threaded lead screw.

* * * * *

UNITED STATES PATENT AND TRADEMARK OFFICE
CERTIFICATE OF CORRECTION

PATENT NO. : 6,065,378
DATED : May 23, 2000
INVENTOR(S) : Donato L. Ricci

It is certified that error appears in the above-identified patent and that said Letters Patent is hereby corrected as shown below:

Claim 5, column 8, line 4, delete "region" and put instead -- relation --.

Claim 8, column 8, line 19, delete "refurbished" and put instead -- turned --.

Claim 9, column 8, lines 23-24, delete "refurbished" and put instead -- turned --.

Signed and Sealed this

Third Day of April, 2001

Attest:

NICHOLAS P. GODICI

Attesting Officer     *Acting Director of the United States Patent and Trademark Office*